May 1, 1951 R. M. KINGMAN 2,551,328
SHAFT COUPLING
Filed May 13, 1946
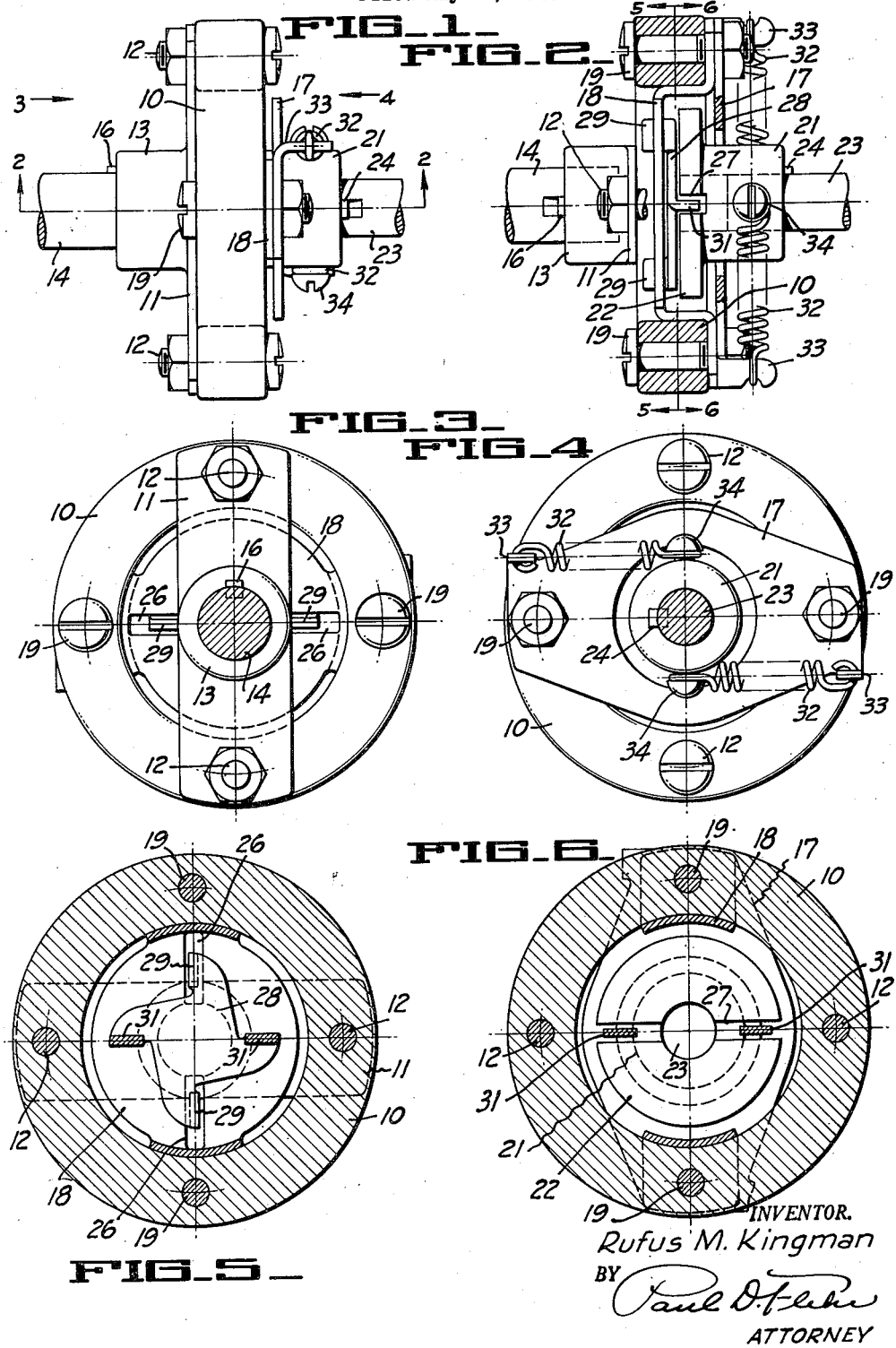
INVENTOR.
Rufus M. Kingman
BY
ATTORNEY Patented May 1, 1951

2,551,328

UNITED STATES PATENT OFFICE 2,551,328

SHAFT COUPLING

Rufus M. Kingman, Palo Alto, Calif., assignor, by mesne assignments, to Hewlett-Packard Company, Palo Alto, Calif., a corporation of California Application May 13, 1946, Serial No. 669,266

4 Claims. (Cl. 64—31)

This invention relates to shaft couplings such as are suitable for forming drive connections between generally aligned shafts of one or more instruments.

It is a general object of the invention to provide an improved drive coupling of the above character which provides for a limited amount of mis-alignment of the driving and driven shafts while eliminating slack in the coupling.

Another object of the invention is to provide a drive coupling of the above character in which tension elements are employed to produce a relative bias between the driving and driven elements.

A further object of the invention is to provide a drive coupling of the above character employing tension elements for eliminating slack which are advantageously arranged with respect to the driving and driven members of the coupling so that relative movement therebetween will not destroy the effectiveness of the tension elements.

Other objects and advantages of the invention will be apparent from the following description of the preferred embodiments of the invention, in which:

Figure 1 is a side elevational view of a drive coupling embodying the instant invention.

Figure 2 is a vertical sectional view of the drive coupling shown in Figure 1.

Figure 3 is a left end elevational view of the coupling taken as indicated by the arrow 3 in Figure 1.

Figure 4 is a right end elevational view of the coupling taken as indicated by the arrow 4 in Figure 1.

Figure 5 is a transverse sectional view taken as indicated by the line 5—5 in Figure 2.

Figure 6 is a transverse sectional view taken as indicated by the line 6—6 in Figure 2.

In providing drive connections for adjustment purposes in instruments or similar apparatus, for example, between the rotors of gang type variable condensers, it is desirable to have a drive coupling which provides for slight mis-alignment between the driving and driven members both as to axial offsetting of the members and as to relative tilting mis-alignment therebetween. At the same time it is highly desirable, particularly for an adjusting drive, that there be no slack or lost motion in the drive connection so that the driven member responds exactly to the motion of the driving member in effecting an adjustment.

The drive coupling of the instant invention attains the above ends and comprises in general a drive member including an annular support ring 10 having a strap 11 secured on one face thereof by bolts 12 and carrying a hub 13 in which a driving shaft 14 may be suitably secured or connected as by means of a key 16. Assuming that it is desired to maintain the shafts electrically insulated with respect to each other, the ring 10 is formed of electrical insulating material such as ceramic or the like. On its opposite face the ring 10 carries a transverse centrally apertured spring bracket 17 and a centrally offset drive connection bracket 18 secured thereto as by the bolts 19.

The driven member comprises a hub 21 provided with an annular flange 22 which is positioned between the drive connection bracket 18 and the spring bracket 17 which also acts as a retainer therefor. The hub 21 is connected to a driven shaft 23 by a key 24.

To provide for a drive connection between the driving and driven members which allows relative axial mis-alignment therebetween, the offset central portion of the drive connection bracket 18 is provided with a pair of diametrically opposed aligned slots 26 which extend at right angles to a diametrical slot 27 in the flange 22 of the driven member 21. A drive connection in the form of a coupling element or key 28 is provided having a pair of ears 29 extending outwardly from one face thereof to engage within the respective slots 26 and having a second pair of ears 31 extending in the other direction to engage within the diametrical slot 27 of the driven member 21.

By virtue of the radial positioning of the ears 29 and 31 with respect to the axis of the drive coupling, a drive relation will be maintained between the parts irrespective of relative axial shifting or relative axial tilting therebetween. The ears 29 and 31 are of sufficient length to maintain the drive connection within the limits of movement of the flange 22 within the spring bracket 17 and the drive connection bracket 18.

In order to eliminate slack or lost motion in the coupling a pair of tension elements in the form of tension springs 32 extend between the respective ears 33 on the spring bracket 17 and oppositely disposed screws or studs 34 on the driven hub 21. With reference to Figure 4, it will be seen that the respective springs 32 act in the same direction in applying a relative twisting bias between the driving and driven members so that the driven member is urged relatively counter-clockwise with respect to the driving member as viewed in Figure 4. Also the linear disposition of the springs 32 is generally parallel to the slots 26 and perpendicular to the slot 27. In general the disposition of the springs is such that with the parts relatively axially aligned, such displacement from axial alignment of the driving and driven members as might be experienced in practice will not materially alter the torque applied by the springs. Furthermore, when the driving and driven members are in alignment, the resultant force components produced by the springs in a direction laterally of the axis are substantially zero. Relative shifting between the driving and driven members either along the line of slots 26 or the line of the slot 27 may take place without hindering the function of the springs 32 in preventing lost motion or slack.

Preferably the strength of springs 32 is selected with reference to the particular use of the drive coupling so that the strength of the springs more than offsets any possible torque transmitted through the drive coupling, even when the torque directly opposes the biased relation of the members of the drive coupling. In this way any slack or lost motion in the drive coupling is prevented and the exact adjusting movement transmitted by the driving shaft 14 will always be received by the driven shaft 23.

It will be appreciated of course that a drive may be transmitted through the drive coupling in either direction and either shaft 14 or shaft 23 can be the drive shaft with the other as the driven shaft.

While I have shown a preferred embodiment of the invention, it will be apparent that the invention is capable of other embodiments and the scope thereof should be limited only by the scope of the claims appended hereto.

I claim:

1. A drive coupling of the Oldham type comprising a drive member and a driven member, each of said members being provided with a transverse slot, said respective slots being disposed substantially at right angles to each other, a key interposed between said members and engaging said slots to provide for relative movement between said members while maintaining a drive connection, and a pair of parallel tension springs disposed in substantially parallel relation to one of said slots and having adjacent inner ends connected to opposite sides of one of said members and having their outer ends respectively connected to opposite diametrical portions of the other of said members.

2. A drive coupling comprising a drive member and a driven member, means connecting said members for limited relative movement to allow both tilting and axially offset misalignment therebetween, and a pair of parallel tension springs having adjacent inner ends connected to opposite sides of one of said members and having their outer ends respectively connected to opposite diametrical portions of the other of said members.

3. A drive coupling including respective drive and driven members, one of said members including a support ring of insulating material, a drive element secured on said ring, a slotted coupling element also secured on said ring in electrically insulated relation from said drive element and having an offset portion disposed within the ring, and a retaining bracket secured to said ring in electrically insulated relation from said drive element, and the other of said members including a flanged hub with the flange thereof disposed between said coupling element and said retaining bracket, a key between said members having radially disposed portions engaging each of said drive members with the respective points of engagement at substantially right angles to each other, and a pair of parallel tension elements connected between respective diametrically opposed points of said members and acting together to apply a twisting bias between the members.

4. A drive coupling comprising a drive member and a driven member adapted to normally rotate in unison about a substantially common axis, drive means of the Oldham type connecting said members for a limited relative movement to allow both tilting and axially offset misalignment therebetween, and a plurality of coil springs adapted to be tensioned by elongation of the same, each spring having its ends attached at radially spaced points to each of said members so that each spring is tensioned in the direction of its length, the inner ends of said springs being attached to the associated one of said members at points spaced from and located on opposite sides of the axis, each spring extending outwardly from said one member on a tension axis offset laterally from the common axis of rotation by substantially equal radial distances, both springs thereby serving to apply a twisting bias between said members with substantially zero resultant force components in a direction laterally of said axis.

RUFUS M. KINGMAN.

REFERENCES CITED

The following references are of record in the file of this patent:

UNITED STATES PATENTS

| Number | Name | Date |
|---|---|---|
| 1,034,249 | Kennington | July 30, 1912 |
| 1,316,011 | Bailey et al. | Sept. 16, 1919 |
| 2,433,791 | Smith | Dec. 30, 1947 |

FOREIGN PATENTS

| Number | Country | Date |
|---|---|---|
| 521,236 | Germany | 1931 |